United States Patent [19]

Padovani

[11] Patent Number: 4,787,798
[45] Date of Patent: Nov. 29, 1988

[54] INLET CHECKING DEVICE FOR A STACKING CHANNEL

[75] Inventor: Pietro Padovani, Verona, Italy

[73] Assignee: O.M.V. SpA (Officine Meccaniche Veronesi), Parona, Italy

[21] Appl. No.: 53,329

[22] Filed: May 21, 1987

[30] Foreign Application Priority Data

Jun. 12, 1986 [IT] Italy ................ 84931 A/86

[51] Int. Cl.⁴ .............................................. B65G 57/16
[52] U.S. Cl. ...................................... 414/30; 221/304; 414/96; 414/97
[58] Field of Search ........................ 414/30, 35, 93, 94, 414/96, 97, 103, 105, 106, 107; 221/301, 304, 308, 310

[56] References Cited

U.S. PATENT DOCUMENTS

| | | | |
|---|---|---|---|
| 1,752,607 | 4/1930 | Miller | 221/308 X |
| 1,940,067 | 12/1933 | Wessman | 221/310 |
| 2,315,827 | 4/1943 | Tansley | 221/304 |
| 2,606,087 | 8/1952 | Tansley | 221/304 |
| 2,711,726 | 6/1955 | Darrell | 221/310 X |
| 2,851,172 | 9/1958 | Seragnoli | 414/107 |
| 3,499,063 | 3/1970 | Ninneman et al. | 414/30 X |
| 4,056,199 | 11/1977 | Schoppee | 414/35 |

FOREIGN PATENT DOCUMENTS

| | | | |
|---|---|---|---|
| 1133308 | 7/1962 | Fed. Rep. of Germany | 414/96 |
| 57-203616 | 12/1982 | Japan | 414/96 |
| 448393 | 6/1936 | United Kingdom | 414/105 |
| 845474 | 8/1960 | United Kingdom | 414/107 |
| 2149717 | 6/1985 | United Kingdom | . |

Primary Examiner—Leslie J. Paperner
Attorney, Agent, or Firm—Ladas & Parry

[57] ABSTRACT

An inlet checking device for a stacking channel comprises at least one jaw provided with at least one inclined plane and a check groove, the jaw being located in a recess of the channel structure, and further comprising at least one jaw loading spring and control mechanisms for adjusting the radial projection of the jaw inside the channel.

5 Claims, 2 Drawing Sheets

INLET CHECKING DEVICE FOR A STACKING CHANNEL

It is known that frusto-conical or frusto-pyramidal hollow objects, which are obtained by thermoforming apparatus through molding and cutting from a sheet of synthetic thermoplastics material, are stacked one inside the other for roomlack, before proceeding to further operations or before being packed for selling.

Channels wherein said objects to be stacked are freely inserted one after the other, by means of moving conveyors as stated in the British patent No. 2149717, are also well known.

The stacking of hollow objects into channels of a horizontal stacker, for instance beakers, as described in the above mentioned patent, has given rise to several drawbacks.

Often a beaker inserted in the channel does not remain positioned coaxially relative to the channel until a further beaker is inserted. An inclined position of a beaker into a stacking channel makes correct insertion of the next beaker, difficult.

In fact some objects are often wrongly positioned inside the stack, also when they are inserted into the channels, having their bottom turned forward with respect to the preceding way in the channel. In this case, in fact, the object inserted in the stack is not a very good drive for the stacking of the further object.

The stack coming out of the channel has often to be reordered because the beakers are not stacked at a constant distance one from the other, and moreover some beakers, having a part of their edges or of their side walls crushed, must be substituted in the stack which has been drawn out.

Sometimes it is even necessary to stop the stacking operation because a wrongly positioned object prevents the stack from proceeding inside the channel, and it is nececessary to remove said object in order to go on with the stacking operations.

The free stacking of the objects inside the channels, as stated above, cannot be used when the objects are not very deep, for instance lids or covers, or when they are inserted into the channels with their part of greater diameter.

An object of the invention is to at least minimize the mentioned drawbacks.

A further object of the invention is to keep a plurality of frusto-conical or frusto-pyramidal hollow objects in the right stacking position at the beginning of the channel, i.e. having the axis of the stack coaxial to channel and having said objects a constant stacking distance one from the other.

According to the present invention there is provided an inlet checking device for a stacking channel, comprising at least one jaw provided with at least one inclined plane and a check groove, said jaw being located in a recess of the channel structure, and further comprising at least one jaw loading spring and control means for adjusting the radial projection of said jaw inside the channel.

The advantage afforded by the invention is to be seen in the fact that the object which is introduced into a stacking channel is maintained coaxial relative to the stacking channel until a further object is introduced so that no misplaced positions may be assumed by the hollow objects during and just after their introduction into the stacking channel.

According to an alternative embodiment of the invention the advantage afforded is to be seen in the fact that a plurality of hollow objects are held coaxial relative to the stacking channel at the beginning of the formation of a stack by the inlet checking device.

The present invention will be further illustrated by way of example, with reference to the accompanying drawings, in which.

Figure 1:
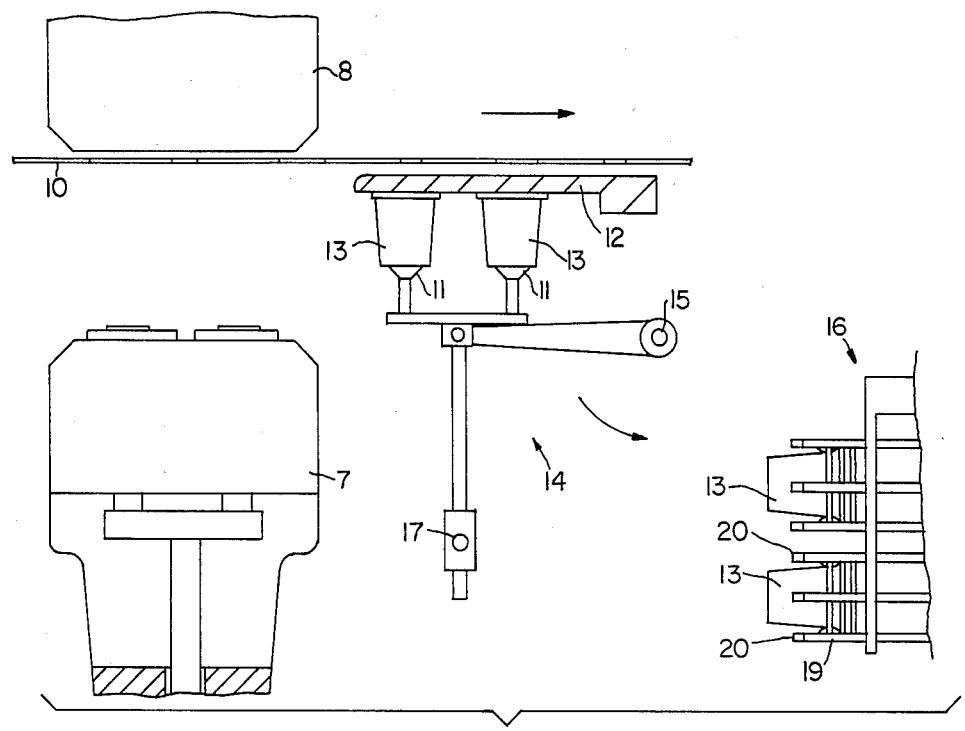
FIG. 1 is schematic view, in partial cross-section, of the two dies of a conventional thermoforming apparatus in the open position with the extractor plate which has removed the objects from a forming and cutting unit, and is in a position appropriate for discharging the objects onto a moving conveyor.
Figure 2:
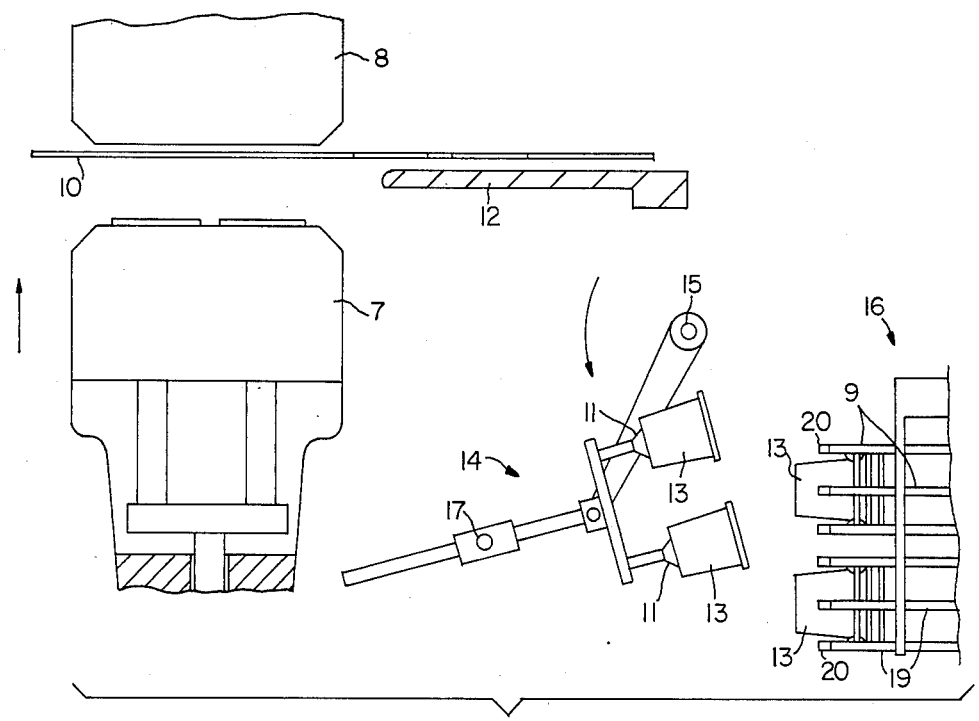
FIG. 2 is a schematic view similar to that in FIG. 1 with the moving conveyor illustrated in the position in which it is inserting the objects into an horizontal stacker.
Figure 3:
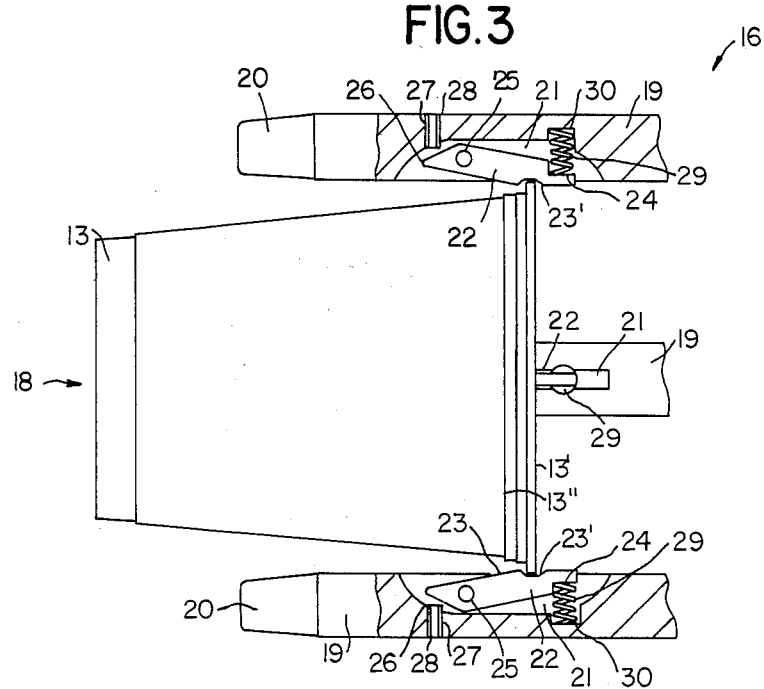
Figure 4:
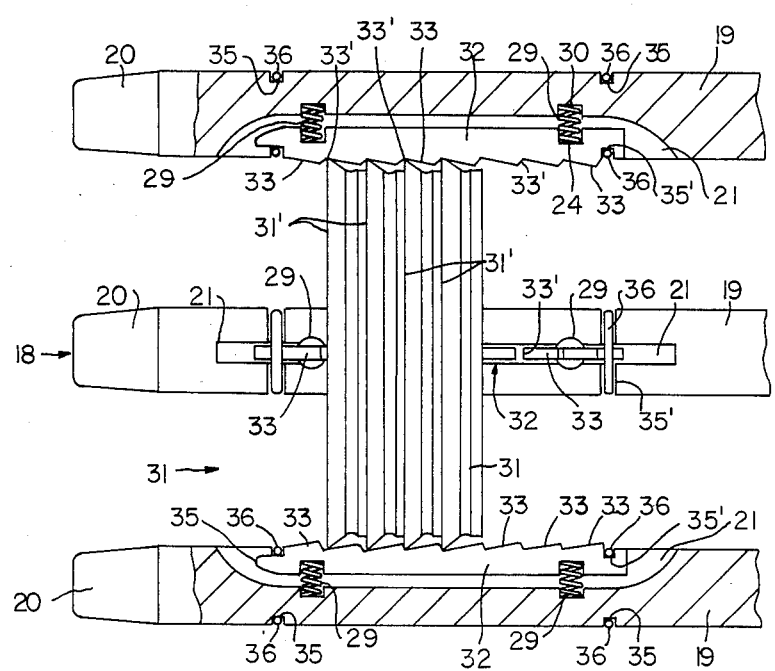

FIG. 3 is a schematic view of the inlet checking device, which is mounted on a channel, in partial cross-section, of the stacker illustrated in FIGS. 1 and 2, with a beaker which is held steady by the jaws of the said device; and FIG. 4 is a schematic view similar to that in FIG. 3, of an alternative embodiment of the inlet checking device, with objects differing from those illustrated in the previous Figures.

In the following description, the same reference numerals are utilised in the Figures of various sizes, to identify identical or equivalent parts.

As illustrated in FIGS. 1 and 2 it is to be noted that the mold of a traditional thermoforming apparatus comprises two dies 7, 8. The die 7 is provided with cavities containing the beakers 13 which are formed and cut from a sheet of synthetic thermoplastics material. The die 8 is provided with formers, not illustrated in the drawings, and with at least one part of the means for cutting thermoformerd objects, the said means being omitted in the Figures. The two dies 7, 8 of the mold are illustrated in FIG. 1 in the open position which allows the extraction of the beakers 13 from the molding unit by means of an extractor plate 12. Said extractor plate is illustrated while abandoning the beakers 13 onto the receptacles. Said receptacles are a part of a lever mechanism indicated by numeral 14 which by rotation around the axes 15, 17 provides for the inserting of the beakers 13 into the stacking channels of a stacker 16', as shown particularly in FIG. 2. Each stacking channel 16 is formed of a plurality of small rods 19 which are parallel to the longitudinal axis of the channel 16 and have a distance from said axis slightly shorter or corresponding to the outer radius of the edge 13' of a beaker 13, as seen particularly in FIG. 3.

It is clear to one skilled in the art, that each stacking channel can be alternartively formed of a continuous wall.

With particular reference to said FIG. 3, it is to be noted that one of the four rods 19 delimiting the stacking channel 16 has been omitted in order to allow the parts which would otherwise concealed by such non illustrated rod, to be visible.

Each rod 19 is provided with a tapering end 20 at the beginning of the channel 16 which permits the introduction of the beaker 13, said beaker being 13 pushed by the lever mechanism 14 in the direction indicated by arrow 18.

The inlet checking device is formed of four jaws 22, each located on a rod in a recess 21 and each having a transverse groove 23' to check the edge 13'. Said groove faces towards the axis of the channel 16. Each jaw is partially rotatable around a pivot 25, which lies in the side walls of the cavity near the jaw end face 26.

A jaw loading spring 29 has an end located in a suitable seat 30 on the bottom of the recess 21, while its opposite end is inserted into a proper seat 24 of the jaw 22. Said jaw projects radially inside the stacking channel 16 with its part far from the pivot 25 because of the action of the spring 29. The length of the projection, inside the channel of said part of the jaw, can be regulated by means of a dowel 28, screwable in a nut 27. The end portion of said dowel 28 projecting from the bottom of the cavity 21, limits the angular movements of the end face 26 of the jaw 22 with respect to the axis of the pivot 25, thus permitting the regulation, according to needs of the length of the maximum expansion of the spring 29.

The lever mechanism 14 leads the edge of the beaker 13 to be positioned in front of the tapering ends 20 and consequently pushes the beaker 13 in the direction of the arrow 18, so that the edge 13' of the beaker, slipping on the surfaces of the rods 19, meets the jaws 22 in the parts 23 which are inclined with respect to the longitudinal axes of the rods 19.

Such an action on the inclined parts or planes 23 overcomes the strength of the spring 29, and the jaws 22 diverge outwardly by their rotation around the pivots 25. This causes a sliding friction of the edge 13' against the inclined planes 23, at the end of which said edge 13' is positioned close to the grooves 23'. Thereafter the receptacles 11 of the lever mechanism 14 leave the beakers 13, while the springs 29 will expand again in order to let the jaws 29 reach their starting position, when the edges 13' lie within the grooves 23'.

The lever mechanism 14, after withdrawing from the beakers, is returned to the positioning of FIG. 1 to start a new cycle.

As clearly shown in FIG. 3, the beaker 13 is in coaxial relation with the stacking channel and consequently it lies in a very good position thus allowing a further beaker to be inserted onto the one previously introduced between the jaws 22.

As the beakers 13 are provided with annular projections 13', which maintain the beakers stacked at a light and constant distance one from the other, the further insertion of a beaker onto that illustrated in FIG. 3, takes place as previously described. It is clear that the thrust of the lever mechanism 14 onto the said beaker overcomes the strength of the return springs 29, as previously mentioned, and permits the beaker previously inserted between the check grooves 23' to proceed one pitch.

With reference to FIG. 4, it is to be noted that the inlet checking device according to an alternative embodiment of the present invention, comprises four jaws 32, each formed of a small bar which is held by the jaw loading springs 29 at a certain distance from the bottom of the recess 21 where it is located, said springs 29 being close to the two ends of the jaw 32 and housed inside seats 30, 24 similar to those described with respect to FIG. 3. The jaws 32 are faced inside the channel with inclined planes 33 which are gullet tooth disposed, so that near the lower parts of said planes, transverse grooves 33' are obtained for the checking of the edges 31' of the lids 31.

It is to be considered that the embodiment illlustrated in FIG. 4 is particularly suitable for hollow objects like covers or lids 31 having a small depth, which are brought to the stacking channels by means of a lever mechanism identical or similar to that illustrated in FIGS. 1 and 2.

The projection of the jaw 32 inside the stacking channel is due to the combined action of the springs 29 and of the rings 36 provided within annular grooves 35 on the rod 19. The said rings in the zone close to the ends of the jaws, are located in grooves 35' provided thereon.

The first cover 31 is inserted in a manner identical to that described with respect to FIG. 3, but in this embodiment the inclined plane 33 proximal to the tapering end 20 of the rod, when pressed by the edge 31', causes the pressing of the underlying spring 29 until the edge 31' reaches the groove 33' downstream of said inclined plane.

In such a position said spring 29 pushes the end of the jaw towards the axis of the channel, so that the edge 31 is caught by the check groove 33' that returns to its starting position.

It is clear that during the insertion of the first cover 31 the jaw 32 rotates partially and returns to the starting position, having the fulcrum located in the groove 35' far from the end 20 of the rod. The cover 31 is thus in a very good position within the stacking channel 16 and is coaxial thereto. During the insertions of further covers, the partial rotation and the return of the jaw 32 takes place with fulcra different from that relating to the first rotation and gradually approaching the bottom of the cavity 21, being in any case close to the groove 35', far from the ends 20 of the rod.

It is clear that when a plurality of covers corresponding to the number of check grooves 33' of the jaw, i.e. seven covers in the present case, has been inserted, during the introduction of a further cover, both the springs 29 are axially pressed, so that no rotation of the jaw 32 takes place. Consequently, the introduction of further covers always leads to axial compressions of both the springs 29 and the jaws move parallel to the longitudinal axis of the stacking channel.

Although not illustrated in FIG. 4, it is clear that the covers 31 may be provided with projections for distancing one cover from another as described in connection with the beakers illustrated in FIG. 3.

The jaws 32 are provided with a number of check grooves 33' inversely proportional to the depth of the cover, thus allowing a conditioned stacking at the beginning of the channel 16, where the stacked covers become a guide to the stack of the covers, preventing any wrong positioning of the said covers within the stack.

From what has been said, it is clear that the inlet checking device having a plurality of check grooves on the jaws as illustrated in FIG. 4, may be used, without prejudice, in place of that of FIG. 3, where the objects to be stacked were beakers or ice-cream cups.

Although not illustrated in the drawings, it is clear that in a stacking channel, the inlet checking device may be carried out with a single jaw, which must therefore compress lightly the edge of the beaker concerned therewith. Consequently, the cross section of the beaker held within the jaws of the inlet checking device will be orthogonal to the axis of the channel even if the the beaker is not coaxial to the channel, the beaker being kept in said position by the light pressure, whereby its edge is elastically deformed by the contact with the rods 19 not provided with jaws.

It is clear to one skilled in the art that the embodiments of the inlet cheking device may be associated with moving conveyors differing from that illustrated.

I claim:

1. An inlet checking device for a stacking channel, said checking device comprising:
    at least one jaw having two generally opposing ends, said jaw being formed of a small bar and defining in its surface at least one annular seat near at least one of said ends, said jaw also defining in its surface a plurality of inclined planes which are gullet toothed to form check grooves which face said channel, said stacking channel defining in its surface annular seats and recesses, one of said jaw being located in one of said recesses;
    at least two jaw loading springs provided generally at said ends of said jaw to raise said jaw from the bottom of said recess;
    control means for adjusting the projection of said jaw inside said channel, said control means being comprised of two rings housed in said annular seats of said bar.

2. An inlet checking device as claimed claim 1, wherein the inside cross section of the channel corresponds to the maximum cross section of the object entering the channel.

3. An inlet checking device as claimed in claim 2, wherein the inside cross section of the channel is circular.

4. An inlet checking device, as claimed in claim 1, wherein the jaw loading spring is comprssed by forcing against the inclined plane upstream the first check groove the edge of a hollow object entering the stacking channel.

5. The inlet checking device as claimed in claim 1 wherein said channel structure has at least one longitudinal axis and wherein said channel structure is formed of a plurality of small rods, said rods lying parallel to said longitudinal axis of the channel and being spaced from one another.

* * * * *